(12) United States Patent
Zhang et al.

(10) Patent No.: US 11,802,071 B2
(45) Date of Patent: Oct. 31, 2023

(54) FIBER OPTIC IMAGING ELEMENT WITH MEDIUM-EXPANSION AND FABRICATION METHOD THEREFOR

(71) Applicant: China Building Materials Academy, Beijing (CN)

(72) Inventors: Lei Zhang, Beijing (CN); Zhenbo Cao, Beijing (CN); Jinsheng Jia, Beijing (CN); Yun Wang, Beijing (CN); Yue Zhao, Beijing (CN); Xian Zhang, Beijing (CN); Xiaofeng Tang, Beijing (CN); Yu Shi, Beijing (CN); Jing Zhang, Beijing (CN); Zhiheng Fan, Beijing (CN); Huichao Xu, Beijing (CN); Haoyang Yu, Beijing (CN); Puguang Song, Beijing (CN); Aixin Wang, Beijing (CN); Changhua Hong, Beijing (CN)

(73) Assignee: China Building Materials Academy, Beijing (CN)

( * ) Notice: Subject to any disclaimer, the term of this patent is extended or adjusted under 35 U.S.C. 154(b) by 0 days.

(21) Appl. No.: 17/766,422

(22) PCT Filed: Jan. 29, 2022

(86) PCT No.: PCT/CN2022/075016
§ 371 (c)(1),
(2) Date: Apr. 4, 2022

(87) PCT Pub. No.: WO2023/040169
PCT Pub. Date: Mar. 23, 2023

(65) Prior Publication Data
US 2023/0212058 A1   Jul. 6, 2023

(30) Foreign Application Priority Data

Sep. 14, 2021 (CN) .......................... 202111073837.5

(51) Int. Cl.
  *C03B 37/028* (2006.01)
  *G02B 6/06* (2006.01)
  (Continued)

(52) U.S. Cl.
  CPC ........ *C03B 37/028* (2013.01); *C03B 37/0128* (2013.01); *C03B 37/01214* (2013.01);
  (Continued)

(58) Field of Classification Search
  None
  See application file for complete search history.

(56) References Cited

U.S. PATENT DOCUMENTS 6,016,376 A * 1/2000 Ghaemi ................. B82Y 35/00
                                                      385/12
2003/0164453 A1* 9/2003 Nakata ...................... G02B 6/06
                                                     250/370.09
(Continued)

FOREIGN PATENT DOCUMENTS

| CN | 103529512 A |   | 1/2014 |           |
|----|-------------|---|--------|-----------|
| CN | 107935381 A |   | 4/2018 |           |
| CN | 111190251 A | * | 5/2020 | C03B 37/028 |

OTHER PUBLICATIONS

First Office Action, 202111073837.5, dated Sep. 5, 2022.

*Primary Examiner* — Chris H Chu
(74) *Attorney, Agent, or Firm* — David R. Stevens; Stevens Law Group (57) ABSTRACT

A fiber optic imaging element includes medium-expansion and a fabrication method including: (1) matching a core glass rod with a cladding glass tube to perform mono fiber drawing; (2) arranging the mono fibers into a mono fiber bundle rod, and then drawing the mono fiber bundle rod into a multi fiber; (3) arranging the multi fiber into a multi fiber bundle rod, and then drawing the multi fiber bundle rod into a multi-multi fiber; (4) cutting the multi-multi fiber, and then
(Continued)

arranging the multi-multi fiber into a fiber assembly buddle, then putting the fiber assembly buddle into a mold of heat press fusion process, and performing the heat press fusion process to prepare a block of the fiber optic imaging element with medium-expansion; and (5) edged rounding, cutting and slicing, face grinding and polishing the prepared medium-expansion block into a billet.

8 Claims, 3 Drawing Sheets

(51) Int. Cl.
    *C03B 37/012*     (2006.01)
    *C03C 13/04*     (2006.01)
    *C03C 3/068*     (2006.01)
    *C03B 37/15*     (2006.01)

(52) U.S. Cl.
    CPC .............. *C03B 37/15* (2013.01); *C03C 3/068* (2013.01); *C03C 13/046* (2013.01); *G02B 6/06* (2013.01); *C03B 2203/40* (2013.01); *C03C 2213/00* (2013.01)

(56) References Cited

U.S. PATENT DOCUMENTS

| | | | | |
|---|---|---|---|---|
| 2005/0000249 A1* | 1/2005 | Mabry | .............. | C03B 37/01214 |
| | | | | 65/410 |
| 2006/0257083 A1* | 11/2006 | Rasmussen | ....... | H01S 3/094007 |
| | | | | 385/115 |

* cited by examiner

FIBER OPTIC IMAGING ELEMENT WITH MEDIUM-EXPANSION AND FABRICATION METHOD THEREFOR

TECHNICAL FIELD

The present invention relates to the field of photoelectron, in particular to a fiber optic imaging element with medium-expansion and fabrication method therefor.

BACKGROUND TECHNOLOGY

Fiber optic imaging elements include fiber optic faceplates, fiber optic image inverters, fiber optic tapers, fiber optic bundle for image transmission, etc. Fiber optic imaging elements are photoelectric imaging devices with excellent performance, which is prepared by unique cladding glass, core glass and absorbing glass, and is prepared by a drawing process of vacuum control and rod-tube combination, so that the product has good air tightness, small distortion, less spots, simple structure, small volume, light weight, large numerical aperture, high light transmission efficiency, small inter-stage coupling loss, high coupling efficiency, high resolution, clear and true image transmission, zero thickness image transfer and other characteristics, which can effectively improve the edge image quality. Fiber optic imaging elements are key materials for image intensifiers and high-definition displays, which are widely used in various cathode ray displays, camera tube, CCD coupling, low-level-light night vision, medical equipment display, high-definition TV imaging and other instruments and equipments that need to transmit images in military, criminal investigation, aerospace, medicine and other fields, and which is a high-tech product in the industry of photoelectron in 21 century.

The most typical application of fiber optic imaging elements is as the optical input and output windows of low-level-light image intensifiers, which make an important role in improving the quality of imaging devices, and which in application need to be sealed with Kovar alloy, so effective sealing and matching with Kovar alloy having a similar coefficient of linear thermal expansion ($50 \times 10^{-7}/°$ C.) is required to improve the stability and prolong the service life of the low-level-light image tube. Fiber optic imaging elements currently used in China use a high expansion system with a coefficient of thermal expansion in the range of $(87 \pm 5) \times 10^{-7}°$ C., which is far from the sealing matching degree of Kovar alloy. In order to improve the thermal stability of the image intensifier device, it is necessary to adopt the fiber optic imaging elements with medium-expansion system, but there is no suitable material with medium-expansion system at present.

SUMMARY

In order to solve the problem that fiber optic imaging elements in the prior art all are high expansion system and to reduce the coefficient of thermal expansion of the fiber optic imaging element, the present invention provides a fiber optic imaging element with medium-expansion and fabrication method therefor.

To achieve the above purposes, the technical solution of the present invention is as follows:

A fabrication method for a fiber optic imaging element with medium-expansion, comprising the following steps:

(1) mono fiber drawing: finely grounding and polishing a surface of core glass rods with medium-expansion to a diameter of 28-29 mm, and then matching the middle-expansion core glass rod with a low refractive index cladding glass tube with a thickness of 4.25-4.75 mm and an inner diameter of 28.5-29.5 mm to perform mono fiber drawing so as to obtain a mono fiber with a diameter of 3.10-3.14 mm;

(2) multi fiber drawing: arranging the mono fibers into a mono fiber bundle rod with an orthohexagonal cross section with 6 mono fibers on each side, and then uniformly inserting light absorbing glass fibers made by drawing a light absorbing glass rod and having a diameter of 0.43-0.47 mm in interstices of the mono fiber bundle rod, and drawing the mono fiber bundle rod inserted with the light absorbing glass fiber into a multi fiber with the orthohexagonal opposite side size of 1.175-1.225 mm, wherein the multi fiber comprises the mono fiber drawn by the combination of the rod and the tube and the light absorbing glass fiber which drawn by the light absorbing glass;

(3) multi-multi fiber drawing: arranging the multi fiber into a multi fiber bundle rod with the orthohexagonal cross section with 14 mono fibers on each side, and drawing the multi fiber bundle rod into a multi-multi fiber with the orthohexagonal opposite side size of 1.085-1.135 mm;

(4) fiber assembly arrangement and heat press fusion process: cutting the multi-multi fiber into a length of 113-133 mm, and then arranging the multi-multi fiber into a fiber assembly buddle with the orthohexagonal cross section with 17 multi-multi fibers on each side, then putting the fiber assembly buddle into a mold of heat press fusion process, designing the compression ratio of the heat press fusion process to be 0.78-0.84, and performing the heat press fusion process to prepare a block plate buddle of the fiber optic imaging element with medium-expansion;

(5) finish machining: edged rounding, cutting and slicing, face grinding and polishing the prepared the fused fiber optic block into a flat plate, wherein the flat plate is subjected to size processing, heating and twisting or stretching to be processed into a fiber optic faceplate, or a fiber optic image inverter or a fiber optic taper with medium-expansion;

The core glass rod with medium-expansion is prepared from a core glass with medium-expansion; and the core glass with medium-expansion comprises the following components in percentage by weight:

| | |
|---|---|
| $SiO_2$ | 5-9% |
| $Al_2O_3$ | 0-1% |
| $B_2O_3$ | 23-28% |
| $CaO$ | 0-3% |
| $BaO$ | 6-12% |
| $La_2O_3$ | 30-34% |
| $Nb_2O_5$ | 4-8% |
| $Ta_2O_5$ | 0-1% |
| $Y_2O_3$ | 0-1% |
| $ZnO$ | 4-9% |
| $TiO_2$ | 4-8% |
| $ZrO_2$ | 4-6% |
| $SnO_2$ | 0-1%. |

Preferably, the core glass with medium-expansion comprises the following components in percentage by weight:

| | |
|---|---|
| $SiO_2$ | 9% |
| $Al_2O_3$ | 1% |
| $B_2O_3$ | 23% |
| $BaO$ | 12% |
| $La_2O_3$ | 34% |
| $Nb_2O_5$ | 4% |

-continued

| | |
|---|---|
| Ta$_2$O$_5$ | 0.5% |
| ZnO | 4% |
| TiO$_2$ | 8% |
| ZrO$_2$ | 4% |
| SnO$_2$ | 0.5%. |

The present application further comprises a core glass with medium-expansion fabrication method:

(1) putting quartz sand, aluminum hydroxide, boric acid or boric anhydride, calcium carbonate, barium carbonate or barium nitrate, lanthanum oxide, niobium oxide, tantalum oxide, yttrium oxide, zinc oxide, titanium dioxide, zirconium oxide and stannic oxide into a platinum crucible according to the requirement of dosing;

(2) melting for 4-8 hours at 1350-1450° C., stirring for 1-2 times in the melting process, then cooling to 1300-1340° C., and fining for 1-2 hours to obtain a fining glass melt;

(3) allowing the fining glass melt to flow down through a material leaking port, and casting the fining glass melt in a mold to form a glass rod;

(4) annealing the molded glass rod in an annealing furnace, preserving heat for 1 hour at 600-650° C., and cooling to 60° C. from 600-650° C. for 12 hours, and then cooling to room temperature along with the furnace to obtain the core glass with medium-expansion.

The core glass with medium-expansion has a refractive index of 1.80-1.82, an coefficient of thermal expansion of $(68\pm5)\times10^{-7}$/° C. in the range of 30-300° C., a strain point temperature of more than 600° C., and a devitrification temperature of more than 820° C.

The present invention further provides a fiber optic imaging element with medium-expansion, which is prepared by the above-mentioned method.

The fiber optic imaging element with medium-expansion has the coefficient of thermal expansion of $(68\pm5)\times10^{-7}$/° C. in the range of 30-300° C., and a heat-resistance temperature of more than 600° C.

The fiber optic imaging element with medium-expansion has a spectral transmission of more than 65% in the wavelength range of 430 nm to 900 nm.

The fiber optic imaging element with medium-expansion has a fiber diameter of less than or equal to 4.0 μm, and a resolution of more than 120 lp/mm The present invention also provides an application of the fiber optic imaging element with medium-expansion in low-level-light night vision technology, the fiber optic imaging element can be applied to low-level-light image intensifier and other field of photoelectron technology.

Compared to the prior art, the beneficial effect of the present invention is that the fiber optic imaging element with medium-expansion in the present invention has the following characteristics:

(1) the fiber optic imaging element with medium-expansion has the coefficient of mean linear thermal expansion of $(68\pm5)\times10^{-7}$/° C. in the range of 30-300° C., and a heat-resistance temperature of more than 600° C.;

(2) the fiber optic imaging element with medium-expansion has a fiber diameter of less than or equal to 4.0 μm, and a resolution of more than 120 lp/mm;

(3) the fiber optic imaging element with medium-expansion has a spectral transmission of more than 65% in the wavelength range of 430 nm to 900 nm.

(4) the fiber optic imaging element with medium-expansion does not contain heavy metal oxides such as As$_2$O$_3$, Sb$_2$O$_3$, PbO, CdO, etc. that are seriously harmful to the environment.

The core glass with medium-expansion in which the fiber optic imaging element with medium-expansion prepared by the present invention is used as core material has the following advantages:

(1) the core glass with medium-expansion has a coefficient of thermal expansion similar to Kovar alloy, the coefficient of thermal expansion in the range of 30 to 300° C. is $(68\pm5)\times10^{-7}$/° C., and the strain point temperature is more than 600° C., which can be used with a sealing material of medium-expansion low-level-light image intensifiers to achieve perfect sealing;

(2) the core glass with medium-expansion has a high refractive index of n$_D$ 1.80~1.82, which can achieve the best light transmission ability of the fiber optic and satisfy the optimum condition of total reflection of the fiber optic that number aperture N.A.≥1;

(3) the core glass with medium-expansion has good anti-crystallization performance of devitrification temperature >820° C., and has good transparency to visible light radiation and good chemical stability, which can meet the requirement of special production process of fiber optic image inverter, and can achieve that the glass remain characteristics of the glass itself unchanged after going through high temperature fiber drawing, high temperature fusing, high temperature twisting or taper drawing.

In the core glass with medium-expansion of the present invention, SiO$_2$ is a glass-forming oxide, which plays an important role in the glass net, and improves chemical resistance. The weight percentage (wt. %) of SiO$_2$ is 5-9. When the content of SiO$_2$ is lower than 5 wt. %, it is difficult to obtain a glass with a medium-expansion coefficient, and the chemical resistance stability of the glass is reduced at the same time; when the content of SiO$_2$ is higher than 10 wt. %, the high temperature viscosity of the glass will increase. As a result, the melting temperature of the glass is too high and the probability of the glass phase separation increases at the same time.

Al$_2$O$_3$ is an intermediate oxide of the glass, and Al$^{3+}$ has two coordination states, that is, in tetrahedron or octahedron. When the content of oxygen is enough in the glass, an aluminum-oxygen tetrahedron [AlO$_4$] is formed and forms a continuous network with a silicon-oxygen tetrahedron. When the content of oxygen is insufficient in the glass, an aluminum-oxygen octahedron [AlO$_6$] is formed, which is the network modifier and is in the hole of the silicon-oxygen structure network, so Al$_2$O$_3$ and SiO$_2$ could form the main body of the glass network within a certain content range. The weight percentage (wt. %) of Al$_2$O$_3$ is 0-1, and when the content of Al$_2$O$_3$ is higher than 1 wt. %, the high temperature viscosity of the glass will increase. As a result, the melting temperature of the glass is too high and the devitrification performance of the glass declines at the same time.

B$_2$O$_3$ is a glass-forming oxide, and also the main component of the glass net, and also a fluxing agent to reducing glass melting viscosity. Boron-oxygen triangle [BO$_3$] and boron-oxygen tetrahedron [BO$_4$] are the structural components, and boron may exist as triangle [BO$_3$] or boron-oxygen tetrahedron [BO$_4$] under different conditions. In high temperature melting conditions, it is difficult to form boron-oxygen tetrahedron, and can only exist in the form of trihedral, but at low temperature, B$^{3+}$ has the tendency to capture free oxygen to form tetrahedron under certain conditions, which makes the structure compact to improves the low temperature viscosity of glass, as it has the characteristics of reducing the glass viscosity at high temperature and increasing the glass viscosity at low temperature, and it is also the main component to reduce the refractive index of glass, which determines that its content range is small. The weight percentage (wt. %) of $B_2O_3$ is 23-28. when the content of $B_2O_3$ is lower than 23 wt. %, which cannot play the role to help melting and meanwhile reduces the chemical stability of the glass; when the content of $B_2O_3$ is more than 28 wt. %, which will reduce the refractive index of the glass and meanwhile increase the tendency of the glass phase separation.

In the present invention, the network former oxides with high content of $B_2O_3$ and $SiO_2$ will decline the refractive index of the glass, thus it is impossible to achieve medium-expansion, or the glass system has a more tendency to devitrification under the condition of certain combinations of rare earth metal oxides and conventional network former oxides. For these reasons, the content of $B_2O_3$ must be more than the content of $SiO_2$.

CaO is a network modifier oxide of glass structure, and the weight percentage (wt. %) of CaO is 0-3. When the content of CaO is more than 3 wt. %, the chemical resistance stability of the glass is reduced, and the coefficient of thermal expansion of the glass is increased.

BaO is a network modifier oxide of glass structure, which can effectively improve the refractive index of glass. The weight percentage (wt. %) of BaO is 6-12. When the content of BaO is less than 6 wt. %, the refractive index of glass is reduced; when the content of BaO is more than 12 wt. %, the devitrificationtemperature of the glass is increased, the devitrificationtendency of the glass is increased, and the density of the glass is increased significantly at the same time.

$La_2O_3$ is a lanthanide series rare earth oxide, which can improve the refractive index of glass. The weight percentage (wt. %) of $La_2O_3$ is 30-34, when the content of $La_2O_3$ is more than 34 wt. %, the coefficient of thermal expansion of the glass will increase; when the content of $La_2O_3$ is less than 30 wt. %, it will decrease the refractive index of the glass.

$Nb_2O_5$ is also a rare earth oxide, which can improve the refractive index and the process performance of glass, and lengthen the liquid fragility of glass. The weight percentage (wt. %) of $Nb_2O_5$ is 4-8, when the content of $Nb_2O_5$ is more than 8 wt. %, the density and coefficient of thermal expansion of the glass is increased; when the content of $Nb_2O_5$ is less than 4 wt. %, the refractive index of the glass is decreased. "high or low liquid fragility" refers to the steep of slope of the viscosity-temperature curve of the glass in the viscosity range of $10^2$-$10^{13}$ dPas, that is, the fluctuate level of the viscosity of the glass with temperature change in this viscosity range. The glass in the present invention has the advantage of being slightly stronger liquid fragility of glass than the comparable glass of the prior art in both critical temperature ranges, and the glass in the present invention is easier to handle and reduce stripes.

$Ta_2O_5$ is also a rare earth oxide, which can increase the refractive index of glass. The weight percentage (wt. %) of $Ta_2O_5$ is 0-1, when the content of $Ta_2O_5$ is more than 1 wt. %, the density and coefficient of thermal expansion of the glass is increased, and the manufacturing cost will increased at the same time.

$Y_2O_3$ is also a rare earth oxide, which can improve the refractive index and the process performance of glass and reduce the melting temperature and devitrification temperature of glass. The weight percentage (wt. %) of $Y_2O_3$ is 0-1. When the content of $Y_2O_3$ is more than 1 wt. %, the cost of glass is increased.

ZnO is used to reduce the melting temperature of glass, and improve the chemical resistance and refractive index of glass, the weight percentage (wt. %) of ZnO is 4-9%. When the content of ZnO is more than 9 wt. %, the chemical resistance stability of glass is reduced and the coefficient of thermal expansion of glass is increased; when the content of ZnO is less than 4 wt. %, the refractive index of glass will reduced.

$TiO_2$ is used to improve the refractive index and the transmittance of glass and increase the oxide of the glass network, thereby reducing the density and high temperature viscosity of glass, which is beneficial to the fining of the glass melt and the elimination of stripes in the process of glass melting. The weight percentage (wt. %) of $TiO_2$ is 4-8. When the content of $TiO_2$ is more than 8 wt. %, the coefficient of thermal expansion of glass is increased; when the content of $TiO_2$ is less than 4 wt. %, the refractive index of glass is reduced. In the high refractive index glass of the present invention, $TiO_2$ can react with iron impurity to form brown iron-titanate complex; in addition, the combination of $TiO_2$ and rare earth metal oxides, $Ta_2O_5$, $Nb_2O_5$ is very challenging in terms of process, because $Nb_2O_5$ also releases oxygen at high temperatures and competes free oxygen with $TiO_2$ which is still dissolved in the glass; if the process is not precisely controlled, the result may be a brown glass.

$ZrO_2$ is used to improve the refractive index and the transmittance of glass, and has the effect of adjusting optical performances and improving the chemical resistance. The weight percentage (wt. %) of $ZrO_2$ is 4-6. When the content of $ZrO_2$ is more than 6 wt. %, the glass melting temperature and the devitrification tendency will increased.

$SnO_2$ is used to fining the glass melting, which can improve the chemical resistance and the transmittance of glass. The weight percentage (wt. %) of $SnO_2$ is 0-1%. When the content of $SnO_2$ is more than 1 wt. %, the bubbles inside the glass will increased.

In the present invention, the following expressions "without X" or "not contain component X" mean that component X hardly exists in the glass, that is, if any, the component exists only as an impurity, which is not added to the composition as a desired component. The glass of the present invention belongs to boron lanthanum barium silicate glass, and the glass does not contain heavy metal oxides such as $As_2O_3$, $Sb_2O_3$, PbO, CdO, etc., which are seriously harmful to the environment, even if there is an extremely microelement amount, it is due to the introduction of other raw materials of the glass.

BRIEF DESCRIPTION OF THE DRAWINGS

The present invention will be further described with reference to drawings and embodiments.

Wherein 1 is a light absorbing glass fiber, 2 is a core glass, and 3 is a cladding glass.

DETAILED DESCRIPTION

In order to make the purposes, technical solutions and advantages of the present invention to be more clarity, the embodiments of the present invention are further described in detail below. The present invention will be further described in detail with reference to drawings and detailed embodiments, but not limited by the description.

The measured parameters, measuring methods and instruments of the core glass with medium-expansion used for the fiber optic imaging element with medium-expansion of the present invention are as follows:

(1) refractive index $n_D$ [the refractive index of glass at $\lambda$=589.3 nm];

(2) the average coefficient of thermal expansion $\alpha_{30/300}$ [$10^{-7}/°$ C.] at 30-300° C.

In the specification, all "weight percent wt. %" are based on the total weight of the final glass composition, and chemical compositions (wt. %) of the glass of the embodiments are detailed listed in Table 1. Wherein the refractive index $n_D$ of glass is measured by a refractive index device; the coefficient of linear thermal expansion at 30-300° C. is measured by a horizontal dilatometer using the method specified in ISO 7991, and expressed by a coefficient of mean linear thermal expansion. Chemical compositions (wt. %) and glass performances of the embodiments are detailed listed in Table 1.

Figure 1:
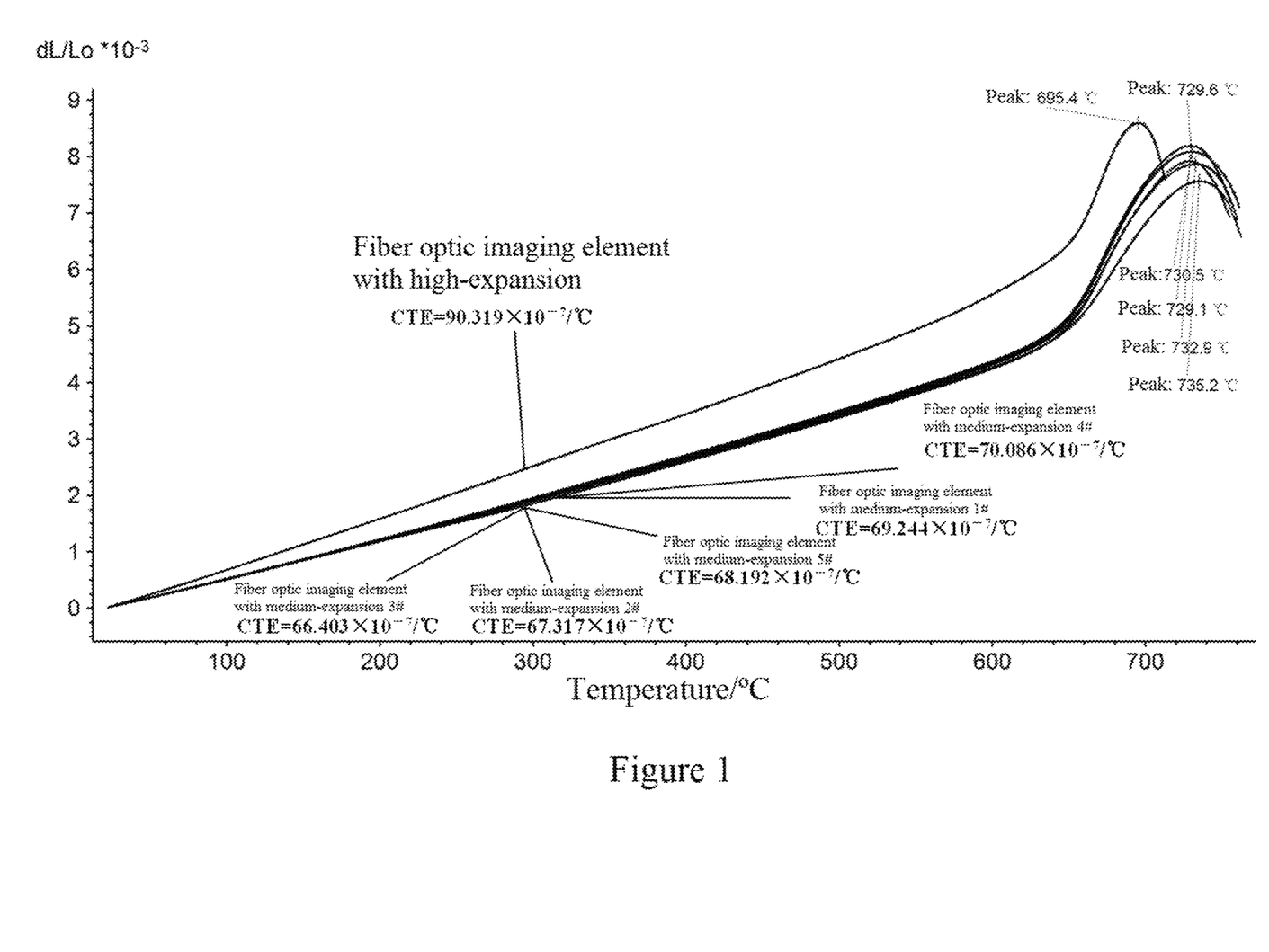
FIG. 1 is a comparison diagram of tests of the coefficient of thermal expansion of embodiments in the present invention of the fiber optic imaging element with medium-expansion and a fiber optic imaging element with high-expansion.

Referring to FIG. 1, in the range of 30-300° C., the fiber optic imaging element with high-expansion is $90.319 \times 10^{-7}$° C., and the coefficient of thermal expansion of the embodiments of the fiber optic imaging element with medium-expansion of the present invention respectively is $69.244 \times 10^{-7}$° C., $67.317 \times 10^{-7}$° C., $66.403 \times 10^{-7}$° C., $70.086 \times 10^{-7}$° C., $68.192 \times 10^{-7}$° C.

Figure 2:
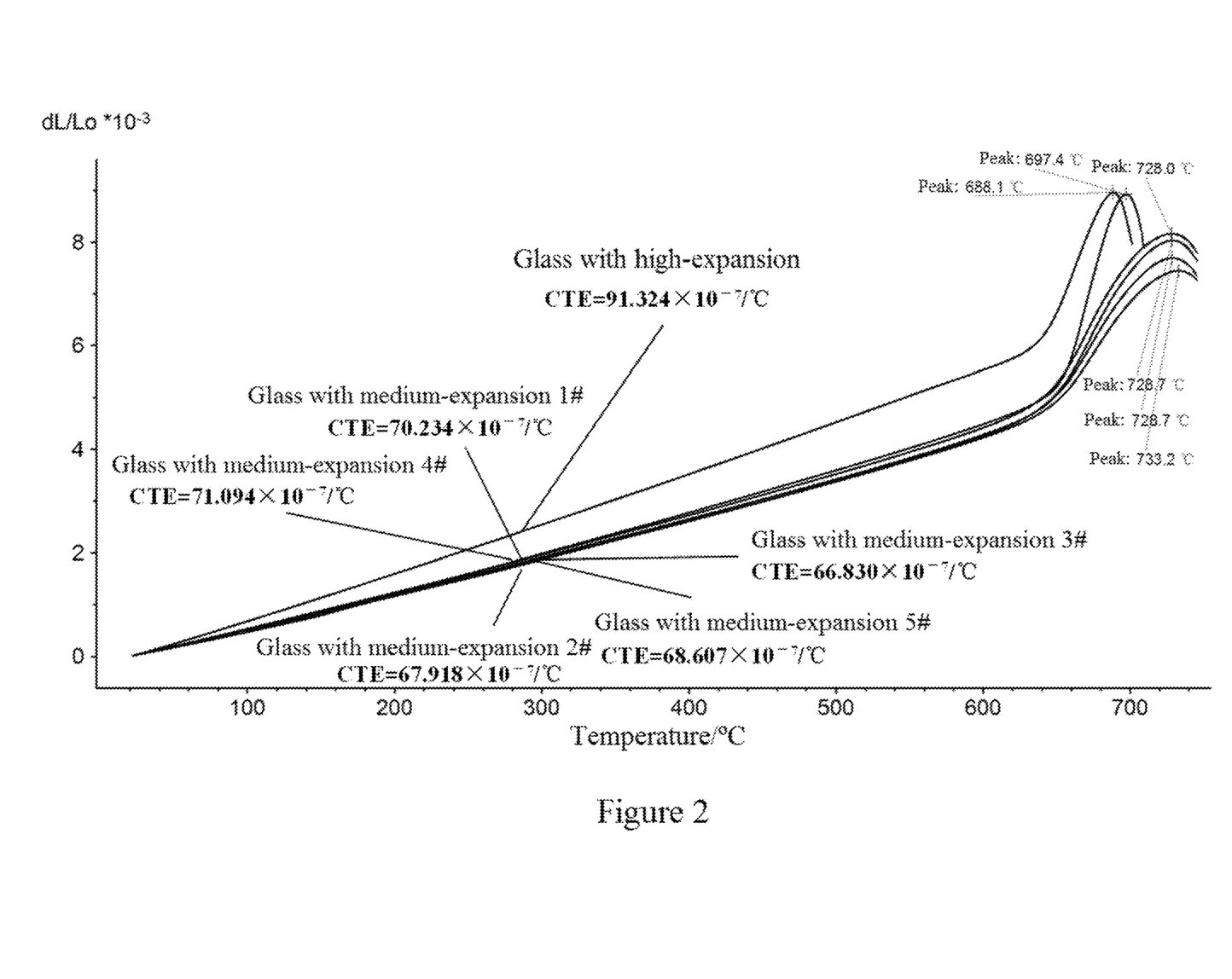
FIG. 2 is a comparison diagram of tests of the coefficient of thermal expansion of embodiments of the core glass with medium-expansion of the present invention and a glass with high coefficient of thermal expansion.

Referring to FIG. 2, in the range of 30-300° C., the coefficient of thermal expansion of the glass with high-expansion is $91.324 \times 10^{-7}$° C., and the coefficient of thermal expansion of the core glass with medium-expansion used in the present invention respectively is $70.234 \times 10^{-7}$° C., $67.918 \times 10^{-7}$° C., $66.830 \times 10^{-7}$° C., $71.094 \times 10^{-7}$° C., $68.607 \times 10^{-7}$° C.

CTE in figures is Coefficient of Thermal Expansion.

Figure 3:
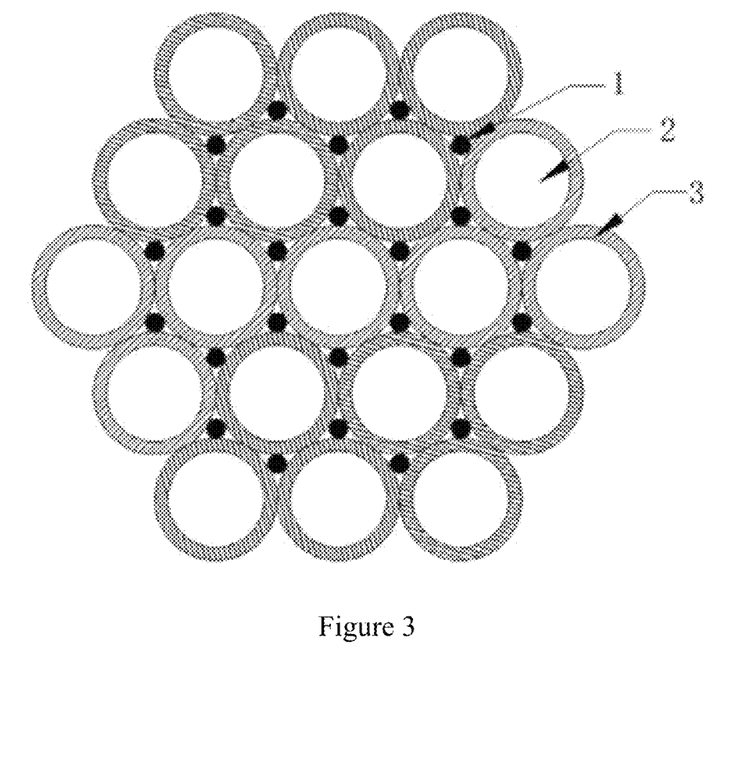
FIG. 3 is a structural schematic diagram of the fiber optic imaging element with medium-expansion provided in the embodiment of the present invention.
Figure 4:
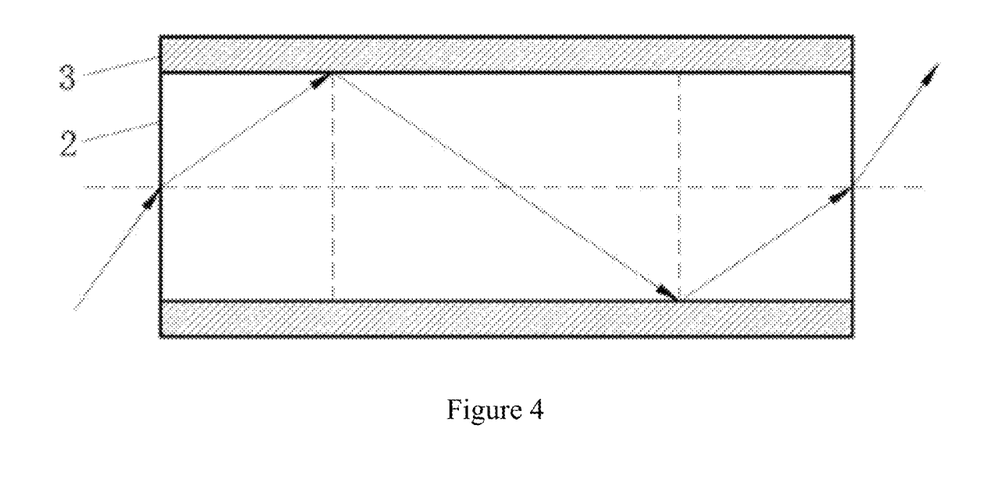
FIG. 4 is a total reflection schematic diagram of the fiber optic being composed of the fiber optic imaging element with medium-expansion provided by the embodiment of the present invention.

Referring to FIGS. 3 and 4, FIG. 3 is a structural schematic diagram of the fiber optic imaging element with medium-expansion. The outer layer of the core glass 2 is provided with the cladding glass 3, and the core glass 2 and the cladding glass 3 compose an fiber. The light absorbing glass fiber 1 are uniformly arranged between the cladding glasses to compose the fiber optic imaging element with medium-expansion.

TABLE 1

| | chemical compositions (wt. %) and physical values of the glass samples | | | | |
|---|---|---|---|---|---|
| composition | embodiment 1 | embodiment 2 | embodiment 3 | embodiment 4 | embodiment 5 |
| SiO2 | 9 | 7 | 7 | 8 | 5 |
| Al2O3 | 1 | 0 | 0 | 0 | 5 |
| B2O3 | 23 | 25 | 25 | 24 | 28 |
| CaO | 0 | 0 | 0 | 0 | 3 |
| BaO | 12 | 8.4 | 10 | 7 | 6 |
| La2O3 | 34 | 32.8 | 32 | 34 | 30 |
| Nb2O5 | 4 | 7 | 6 | 7.5 | 8 |
| Ta2O3 | 0.5 | 0.5 | 0.5 | 0 | 0.5 |
| Y2O3 | 0 | 0 | 0 | 0.5 | 0 |
| ZnO | 4 | 8 | 8 | 7 | 9 |
| TiO2 | 8 | 7 | 6 | 5 | 4 |
| ZrO2 | 4 | 4 | 5 | 6 | 6 |
| SnO2 | 0.5 | 0.26 | 0.5 | 1 | 0.5 |
| $\alpha_{30/300}$ [$10^{-7}/°$ C.] | 70.234 | 67.918 | 66.830 | 71.094 | 68.607 |
| $n_D$ | 1.80 | 1.82 | 1.82 | 1.82 | 1.81 |

The raw materials used in the following embodiments and their requirements are as follows:

Quartz sand (high purity, 150 μm oversize is less than 1%, 45 μm undersize is less than 30%, the content of $Fe_2O_3$ is less than 0.01 wt. %), aluminum hydroxide (analytical purity, average particle size 50 μm), boric acid or boron anhydride (400 μm oversize is less than 10%, 63 μm undersize is less than 10%), calcium carbonate (analytical purity, average particle size 250 μm), barium carbonate (analytical purity, purity >99.0%), lanthanum trioxide (5N), niobium pentoxide (5N), tantalum pentoxide (5N), yttrium trioxide (5N), zinc oxide (analytical purity), titanium dioxide (chemical purity), zirconium oxide (analytical purity), stannic oxide (analytical purity).

Embodiment 1

Fabrication of Core Glass with Medium-Expansion:

Raw materials are selected according to the glass composition of embodiment 1 in Table 1, and oxides of elements with valence state change in the glass raw materials such as $Fe_2O_3$ are strictly controlled, and the content of $Fe_2O_3$ in a finished product of glass is less than 100 PPm. Ingredients of glass meet the chemical compositions of glass in Table 1, and then quartz sand, aluminum hydroxide, boric acid, calcium carbonate, barium carbonate, lanthanum oxide, niobium oxide, tantalum oxide, yttrium oxide, zinc oxide, titanium dioxide, zirconium oxide and stannic oxide are put into a platinum crucible and melted for 6 hours at 1400° C. In the glass melting process, the glass is stirred twice to melt evenly. After melting, the glass is cooled to 1320° C. and fining for 2 hours to obtain a molten glass. Thereafter, the molten glass is cast into a test specimen according to the specified requirements, then annealing is carried out and the annealing process is that preserving heat for 1 hour at 625° C., and cooling to 60° C. from 625° C. for 12 hours, and then cooling to room temperature along with the furnace. Its test performance is shown in Table 1, (1) a refractive index is 1.80; (2) a coefficient of mean linear thermal expansion at 30-300° C. is 70.234×10$^{-7}$/° C.

Fabrication of the Fiber Optic Imaging Element with Medium-Expansion:

(1) mono fiber drawing: finely grounding and polishing a surface of an environment-friendly middle-expansion core glass rod with a high refractive index to a diameter of 28.5 mm, and then matching the middle-expansion core glass rod with a low refractive index cladding glass tube with a thickness of 4.5 mm and an inner diameter of 29.0 mm to drawing mono fiber so as to obtain a mono fiber with a diameter of 3.12 mm;

(2) multi fiber drawing: arranging the mono fibers into a mono fiber bundle rod with an orthohexagonal cross section with 6 mono fibers on each side, and then uniformly inserted light absorbing glass fibers made by drawing a light absorbing glass with a diameter of 0.44 mm in each interstices of the mono fiber array, and drawing the mono fiber bundle rod into a multi fiber with the orthohexagonal opposite side size of 1.200 mm;

(3) multi-multi fiber drawing: arranging the multi fiber into a multi fiber bundle rod with the orthohexagonal cross section with 14 mono fibers on each side, and drawing the multi fiber bundle rod into a multi-multi fiber with the orthohexagonal opposite side size of 1.110 mm;

(4) fiber assembly arrangement and heat press fusion process: cutting the multi-multi fiber into a length of 130 mm, and then arranging the multi-multi fiber into a fiber assembly buddle with the orthohexagonal cross section with 17 multi-multi fibers on each side, then putting the fiber assembly buddle into a mold of heat press fusion process, designing the compression ratio of the heat press fusion process to be 0.80, and the multi-multi fiber arranged into a fiber assembly buddle is performed the heat press fusion process to prepare a block plate buddle of the fiber optic imaging element with medium-expansion;

(5) finish machining: edged rounding, cutting and slicing, face grinding and polishing the prepared fused fiber optic block plate of the fiber optic imaging element with medium-expansion into a block of the fiber optic imaging element with medium-expansion, wherein the block is subjected to heating and twisting to be processed into a fiber optic image inverter with medium-expansion.

Its test performance is as follows, (1) an coefficient of mean linear thermal expansion at 30-300° C. is 69.244×10$^{-7}$/° C.; (2) a heat-resistance temperature is 610.9° C.; (3) a fiber diameter is 3.98 μm, a resolution >120 lp/mm.

Embodiment 2

Fabrication of Core Glass with Medium-Expansion:

The actual composition of glass refers to embodiment 2 in Table 1, and uses the same requirements for raw material as embodiment 1. Quartz sand, aluminum hydroxide, boric anhydride, calcium carbonate, barium nitrate, lanthanum oxide, niobium oxide, tantalum oxide, yttrium oxide, zinc oxide, titanium dioxide, zirconium oxide and stannic oxide are put into a platinum crucible and melted for 8 hours at 1350° C. In the glass melting process, the glass is stirred once to melt evenly. After melting, the glass is cooled to 1300° C. and fining for 1 hour to obtain a molten glass. Thereafter, the molten glass is cast into a test sample according to the specified requirements, then annealing is carried out and the annealing process is that preserving heat for 1 hour at 600° C., and cooling to 60° C. from 600° C. for 12 hours, and then cooling to room temperature along with the furnace. The test conditions used are the same as embodiment 1, and the basic performances of samples are shown in Table 1. (1) a refractive index is 1.82; (2) an coefficient of mean linear thermal expansion at 30-300° C. is 67.918×10$^{-7}$/° C.

Fabrication of Fiber Optic Element with Medium-Expansion:

(1) mono fiber drawing: finely grounding and polishing a surface of an environment-friendly middle-expansion core glass rod with a high refractive index to a diameter of 29.0 mm, and then matching the middle-expansion core glass rod with a low refractive index cladding glass tube with a thickness of 4.75 mm and an inner diameter of 29.5 mm to perform mono fiber drawing so as to obtain a mono fiber with a diameter of 3.14 mm;

(2) multi fiber drawing: arranging the mono fibers into a mono fiber bundle rod with an orthohexagonal cross section with 6 mono fibers on each side, and then uniformly inserting light absorbing glass fibers made by drawing a light absorbing glass with a diameter of 0.43 mm in each interstices of the mono fiber array, and drawing the mono fiber bundle rod into a multi fiber with the orthohexagonal opposite side size of 1.205 mm, wherein the multi fiber comprises the mono fiber drawn by the combination of the rod and the tube and the light absorbing glass fiber drawn by the light absorbing glass rod;

(3) multi-multi fiber drawing: arranging the multi fiber into a multi fiber bundle rod with the orthohexagonal cross section with 14 mono fibers on each side, and drawing the multi fiber bundle rod into a multi-multi fiber with the orthohexagonal opposite side size of 1.105 mm;

(4) fiber assembly arrangement and heat press fusion process: cutting the multi-multi fiber into a length of 133 mm, and then arranging the multi-multi fiber into a fiber assembly buddle with the orthohexagonal cross section with 17 multi-multi fibers on each side, then putting the fiber assembly buddle into a mold of heat press fusion process, designing the compression ratio of the heat press fusion process to be 0.78, and the multi-multi fiber arranged into a fiber assembly buddle is performed the heat press fusion process to prepare a block plate buddle of the fiber optic imaging element with medium-expansion;

(5) finish machining: edged rounding, cutting and slicing, face grinding and polishing the prepared block plate buddle of the fiber optic imaging element with medium-expansion into a block of the fiber optic imaging element with medium-expansion, wherein the block is subjected to heating and stretching molding to be processed into a fiber optic taper with medium-expansion.

Its test performance is as follows, (1) a coefficient of mean linear thermal expansion at 30-300° C. is 67.317×10$^{-7}$/° C.; (2) a heat-resistance temperature is 613.3° C.; (3) a fiber diameter is 4.0 μm, a resolution >120 lp/mm.

Embodiment 3

Fabrication of Core Glass with Medium-Expansion:

The actual composition of glass refers to embodiment 3 in Table 1, and uses the same raw material and requirements for raw material as embodiment 1. Raw materials are melted for 4 hours at 1450° C. In the glass melting process, the glass is stirred twice to melt evenly. After melting, the glass is cooled to 1340° C. and fining 2 hours to obtain a molten glass. Thereafter, the molten glass is cast into a test sample according to the specified requirements, then annealing is carried out and the annealing process is that preserving heat for 1 hour at 650° C., and cooling to 60° C. from 650° C. for 12 hours, and then cooling to room temperature along with the furnace. The test conditions used are the same as embodiment 1, and the basic performances of samples are shown in Table 1. (1) a refractive index is 1.82; (2) an coefficient of mean linear thermal expansion at 30-300° C. is $66.830 \times 10^{-7}/°$ C.

Fabrication of Fiber Optic Element with Medium-Expansion:

(1) mono fiber drawing: finely grounding and polishing a surface of an environment-friendly middle-expansion core glass rod with a high refractive index to a diameter of 28.0 mm, and then matching the middle-expansion core glass rod with a low refractive index cladding glass tube with a thickness of 4.4 mm and an inner diameter of 28.5 mm to perform mono fiber drawing so as to obtain a mono fiber with a diameter of 3.11 mm;

(2) multi fiber drawing: arranging the mono fibers into a mono fiber bundle rod with an orthohexagonal cross section with 6 mono fibers on each side, and then uniformly inserting light absorbing glass fibers made by drawing a light absorbing glass with a diameter of 0.46 mm in each interstices of the mono fiber array, and drawing the mono fiber bundle rod into a multi fiber with the orthohexagonal opposite side size of 1.175 mm, wherein the multi fiber comprises the mono fiber drawn by the combination of the rod and the tube and the light absorbing glass fiber drawn by the light absorbing glass;

(3) multi-multi fiber drawing: arranging the multi fiber into a multi fiber bundle rod with the orthohexagonal cross section with 14 mono fibers on each side, and drawing the multi fiber bundle rod into a multi-multi fiber with the orthohexagonal opposite side size of 1.115 mm;

(4) fiber assembly arrangement and heat press fusion process: cutting the multi-multi fiber into a length of 128 mm, and then arranging the multi-multi fiber into a fiber assembly buddle with the orthohexagonal cross section with 17 multi-multi fibers on each side, then putting the fiber assembly buddle into a mold of heat press fusion process, designing the compression ratio of the heat press fusion process to be 0.84, and the multi-multi fiber arranged into a fiber assembly buddle is performed the heat press fusion process to prepare a block plate buddle of the fiber optic imaging element with medium-expansion;

(5) finish machining: edged rounding, cutting and slicing, face grinding and polishing the prepared block plate buddle of the fiber optic imaging element with medium-expansion into a block of the fiber optic imaging element with medium-expansion, wherein the block is subjected to size processing to be processed into a fiber optic faceplate with medium-expansion.

Its test performance is as follows, (1) a coefficient of mean linear thermal expansion at 30-300° C. is $66.403 \times 10^{-7}/°$ C.; (2) a heat-resistance temperature is 612.1° C.; (3) a fiber diameter is 3.99 μm, a resolution >120 lp/mm.

Embodiment 4

Fabrication of Core Glass with Medium-Expansion:

The actual composition of glass refers to embodiment 4 in Table 1, uses the same raw material and requirements for raw material as embodiment 1 and adopts the same melting process system and test conditions as embodiment 1. The basic performances of samples are shown in Table 1. (1) a refractive index is 1.82; (2) a coefficient of mean linear thermal expansion at 30-300° C. is $71.094 \times 10^{-7}/°$ C.

Fabrication of Fiber Optic Imaging Element with Medium-Expansion:

(1) mono fiber drawing: finely grounding and polishing a surface of an environment-friendly middle-expansion core glass rod with a high refractive index to a diameter of 28.5 mm, and then matching the middle-expansion core glass rod with a low refractive index cladding glass tube with a thickness of 4.5 mm and an inner diameter of 29.0 mm to perform mono fiber drawing so as to obtain a mono fiber with a diameter of 3.12 mm;

(2) multi fiber drawing: arranging the mono fibers into a mono fiber bundle rod with an orthohexagonal cross section with 6 mono fibers on each side, and then uniformly inserting light absorbing glass fibers made by drawing a light absorbing glass with a diameter of 0.45 mm in each interstices of the mono fiber array, and drawing the mono fiber bundle rod into a multi fiber with the orthohexagonal opposite side size of 1.200 mm, wherein the multi fiber comprises the mono fiber drawn by the combination of the rod and the tube and the light absorbing glass fiber which drawn by the light absorbing glass;

(3) multi-multi fiber drawing: arranging the multi fiber into a multi fiber bundle rod with the orthohexagonal cross section with 14 mono fibers on each side, and drawing the multi fiber bundle rod into a multi-multi fiber with the orthohexagonal opposite side size of 1.110 mm;

(4) fiber assembly arrangement and heat press fusion process: cutting the multi-multi fiber into a length of 133 mm, and then arranging the multi-multi fiber into a fiber assembly buddle with the orthohexagonal cross section with 17 multi-multi fibers on each side, then putting the fiber assembly buddle into a mold of heat press fusion process, designing the compression ratio of the heat press fusion process to be 0.82, and the multi-multi fiber arranged into a fiber assembly buddle is performed the heat press fusion process to prepare a block plate buddle of the fiber optic imaging element with medium-expansion;

(5) finish machining: rounding, cutting, end face grinding and polishing the prepared medium-expansion plate buddle into a block of the fiber optic imaging element with medium-expansion, wherein the block is subjected to heating and twisting molding or stretching molding to be processed into a fiber optic taper with medium-expansion.

Its test performance is as follows, (1) a coefficient of mean linear thermal expansion at 30-300° C. is $70.086 \times 10^{-7}/°$ C.; (2) a heat-resistance temperature is 612.7° C.; (3) a fiber diameter is 3.97 μm, a resolution >120 lp/mm.

Embodiment 5

Fabrication of Core Glass with Medium-Expansion:

The actual composition of glass refers to embodiment 5 in Table 1, uses the same raw material and requirements for raw material as embodiment 1 and adopts the same melting process system and test conditions as embodiment 1. The basic performances of samples are shown in Table 1. (1) a refractive index is 1.81; (2) a coefficient of mean linear thermal expansion at 30-300° C. is $68.607 \times 10^{-7}/°$ C.

Fabrication of Fiber Optic Element with Medium-Expansion:

(1) mono fiber drawing: finely grounding and polishing a surface of an environment-friendly middle-expansion core glass rod with a high refractive index to a diameter of 28.5 mm, and then matching the middle-expansion core glass rod with a low refractive index cladding glass tube with a thickness of 4.25 mm and an inner diameter of 29.0 mm to perform mono fiber drawing so as to obtain a mono fiber with a diameter of 3.122 mm;

(2) multi fiber drawing: arranging the mono fibers into a mono fiber bundle rod with an orthohexagonal cross section with 6 mono fibers on each side, and then uniformly inserting light absorbing glass fibers made by drawing a light absorbing glass with a diameter of 0.44 mm in each interstices of the mono fiber array, and drawing the mono fiber bundle rod into a multi fiber with the orthohexagonal opposite side size of 1.192 mm;

(3) multi-multi fiber drawing: arranging the multi fiber into a multi fiber bundle rod with the orthohexagonal cross section with 14 mono fibers on each side, and drawing the multi fiber bundle rod into a multi-multi fiber with the orthohexagonal opposite side size of 1.085 mm;

(4) fiber assembly arrangement and heat press fusion process: cutting the multi-multi fiber into a length of 132 mm, and then arranging the multi-multi fiber into a fiber assembly buddle with the orthohexagonal cross section with 17 multi-multi fibers on each side, then putting the fiber assembly buddle into a mold of heat press fusion process, designing the compression ratio of the heat press fusion process to be 0.83, and the multi-multi fiber arranged into a fiber assembly buddle is performed the heat press fusion process to prepare a block plate buddle of the fiber optic imaging element with medium-expansion;

(5) finish machining: rounding, cutting, end face grinding and polishing the prepared medium-expansion plate buddle into a block of the fiber optic imaging element with medium-expansion, wherein the block is subjected to heating and twisting molding to be processed into a fiber optic image inverter with medium-expansion.

Its test performance is as follows, (1) a coefficient of mean linear thermal expansion at 30-300° C. is 68.192×10$^{-7}$/° C.; (2) a heat-resistance temperature is 609.9° C.; (3) a fiber diameter is 3.98 μm, a resolution >120 lp/mm.

The present invention also provides an application for the fiber optic imaging element (including fiber optic faceplate, fiber optic image inverter, fiber optic taper, fiber optic bundle for image transmission, etc.), and the fiber optic imaging element with medium-expansion can be applied to low-level-light image intensifier and other field of photoelectron technology.

The above descriptions are only preferred embodiments of the present invention, and are not intended to limit the present invention. Any modification, equivalent replacement, improvement, etc. made within the spirit and principle of the present invention should be included in the protection scope of the present invention.

What is claimed is:

1. A fabrication method for a fiber optic imaging element with medium-expansion, comprising the following steps:
   (1) mono fiber drawing: finely grounding and polishing a surface of a middle-expansion core glass rod to a diameter of 28-29 mm, and then matching the middle-expansion core glass rod with a low refractive index cladding glass tube with a thickness of 4.25-4.75 mm and an inner diameter of 28.5-29.5 mm to perform mono fiber drawing so as to obtain a mono fiber with a diameter of 3.10-3.14 mm;
   (2) multi fiber drawing: arranging the mono fibers into a mono fiber bundle rod with an orthohexagonal cross section with 6 mono fibers on each side, and then uniformly inserting light absorbing glass fibers made by drawing a light absorbing glass rod and having a diameter of 0.43-0.47 mm in interstices of the mono fiber bundle rod, and drawing the mono fiber bundle rod inserted with the light absorbing glass fiber into a multi fiber with the orthohexagonal opposite side size of 1.175-1.225 mm, wherein the multi fiber comprises the mono fiber drawn by the combination of the rod and the tube and the light absorbing glass fiber which drawn by the light absorbing glass;
   (3) multi-multi fiber drawing: arranging the multi fiber into a multi fiber bundle rod with the orthohexagonal cross section with 14 mono fibers on each side, and drawing the multi fiber bundle rod into a multi-multi fiber with the orthohexagonal opposite side size of 1.085-1.135 mm;
   (4) fiber assembly arrangement and heat press fusion process: cutting the multi-multi fiber into a length of 113-133 mm, and then arranging the multi-multi fiber into a fiber assembly bundle with the orthohexagonal cross section with 17 multi-multi fibers on each side, then putting the fiber assembly bundle into a mold of heat press fusion process, designing the compression ratio of the heat press fusion process to be 0.78-0.84, and performing the heat press fusion process to prepare a block plate bundle of the fiber optic imaging element with medium-expansion;
   (5) finish machining: edged rounding, cutting and slicing, face grinding and polishing the prepared block plate bundle of the fiber optic imaging element with medium-expansion into a block of the fiber optic imaging element with medium-expansion, wherein the block is subjected to size processing, heating and twisting or stretching to be processed into a fiber optic faceplate with medium-expansion, a fiber optic image inverter with medium-expansion or a fiber optic taper with medium-expansion;
   wherein the core glass with medium-expansion rod is prepared from a core glass with medium-expansion;
   wherein the core glass with medium-expansion comprises the following components in percentage by weight:

| | |
|---|---|
| SiO$_2$ | 5-9% |
| Al$_2$O$_3$ | 0-1% |
| B$_2$O$_3$ | 23-28% |
| CaO | 0-3% |
| BaO | 6-12% |
| La$_2$O$_3$ | 30-34% |
| Nb$_2$O$_5$ | 4-8% |
| Ta$_2$O$_5$ | 0-1% |
| Y$_2$O$_3$ | 0-1% |
| ZnO | 4-9% |
| TiO$_2$ | 4-8% |
| ZrO$_2$ | 4-6% |
| SnO$_2$ | 0-1%. |

2. The fabrication method for a fiber optic imaging element with medium-expansion according to claim 1, wherein the core glass with medium-expansion comprises the following components in percentage by weight:

| | |
|---|---|
| SiO$_2$ | 9% |
| Al$_2$O$_3$ | 1% |
| B$_2$O$_3$ | 23% |
| BaO | 12% |
| La$_2$O$_3$ | 34% |
| Nb$_2$O$_5$ | 4% |
| Ta$_2$O$_5$ | 0.5% |
| ZnO | 4% |
| TiO$_2$ | 8% |
| ZrO$_2$ | 4% |
| SnO$_2$ | 0.5%. |

3. The fabrication method according to claim 1, further comprising preparing a core glass with medium-expansion:
(1) putting quartz sand, aluminum hydroxide, boric acid or boric anhydride, calcium carbonate, barium carbonate or barium nitrate, lanthanum oxide, niobium oxide, tantalum oxide, yttrium oxide, zinc oxide, titanium dioxide, zirconium oxide and stannic oxide into a platinum crucible according to the requirement of dosing;
(2) melting for 4-8 hours at 1350-1450° C., stirring for 1-2 times in the melting process, then cooling to 1300-1340° C., and fining for 1-2 hours to obtain a fining glass melt;
(3) allowing the fining glass melt to flow down through a material leaking port, and casting the fining glass melt in a mold to form a glass rod;
(4) annealing the molded glass rod in an annealing furnace, preserving heat for 1 hour at 600-650° C., and cooling to 60° C. from 600-650° C. for 12 hours, and then cooling to room temperature along with the furnace to obtain the core glass with medium-expansion.

4. The fabrication method for a fiber optic imaging element with medium-expansion according to claim 1, wherein the core glass with medium-expansion has a refractive index of 1.80-1.82, a coefficient of mean linear thermal expansion of $(68\pm5)\times10^{-7}$° C. in the range of 30-300° C., a strain point temperature of more than 600° C., and a devitrification temperature of more than 820° C.

5. A fiber optic imaging element with medium-expansion, wherein the fiber optic imaging element with medium-expansion is prepared by using the fabrication method according to claim 1.

6. The fiber optic imaging element with medium-expansion according to claim 5, wherein the fiber optic imaging element with medium-expansion has the coefficient of mean linear thermal expansion of $(68\pm5)\times10^{-7}$/° C. in the range of 30-300° C., and a heat-resistance temperature of more than 600° C.

7. The fiber optic imaging element with medium-expansion according to claim 5, wherein the fiber optic imaging element with medium-expansion has a spectral transmission of more than 65% in the wavelength range of 430 nm to 900 nm.

8. The fiber optic imaging element with medium-expansion according to claim 5, wherein the fiber optic imaging element with medium-expansion has a fiber diameter of less than or equal to 4.0 and a resolution of more than 120 lp/mm.

* * * * *